US008909356B2

(12) United States Patent
Honma et al.

(10) Patent No.: US 8,909,356 B2
(45) Date of Patent: Dec. 9, 2014

(54) APPLIANCE CONTROL DEVICE, REGISTRATION METHOD OF APPLIANCE CONTROL DEVICE, AND PROGRAM

(75) Inventors: Tsuyoshi Honma, Tokyo (JP); Yoshinori Ohashi, Tokyo (JP); Eiju Yamada, Kanagawa (JP)

(73) Assignee: Sony Corporation (JP)

( * ) Notice: Subject to any disclaimer, the term of this patent is extended or adjusted under 35 U.S.C. 154(b) by 323 days.

(21) Appl. No.: 13/304,940

(22) Filed: Nov. 28, 2011

(65) Prior Publication Data

US 2012/0143355 A1 Jun. 7, 2012

(30) Foreign Application Priority Data

Dec. 6, 2010 (JP) ................ P2010-271870

(51) Int. Cl.
*G05B 19/02* (2006.01)
*H04L 12/28* (2006.01)

(52) U.S. Cl.
CPC ........ *H04L 12/2809* (2013.01); *H04L 12/2807* (2013.01); *H04L 12/2818* (2013.01)
USPC ................ 700/17; 700/19; 709/223; 709/224

(58) Field of Classification Search
CPC .. G05B 19/02; G05B 19/0426; G05B 19/054; G05B 2219/2642
USPC ............... 700/17, 19; 709/223, 224
See application file for complete search history.

(56) References Cited

U.S. PATENT DOCUMENTS

| | | | |
|---|---|---|---|
| 7,519,437 B2* | 4/2009 | Sugiyama | .................. 700/19 |
| 7,853,207 B2 | 12/2010 | Harada et al. | |
| 2006/0122712 A1* | 6/2006 | Sugiyama | .................. 700/19 |
| 2006/0258289 A1 | 11/2006 | Dua | |
| 2008/0068152 A1 | 3/2008 | Igoe | |
| 2008/0098088 A1* | 4/2008 | Tamano et al. | ............ 709/218 |
| 2011/0295996 A1* | 12/2011 | Qiu et al. | .................. 709/224 |

FOREIGN PATENT DOCUMENTS

| | | |
|---|---|---|
| EP | 1939723 A2 | 7/2008 |
| JP | 10093665 | 4/1998 |
| JP | 2003196177 A | 7/2003 |
| JP | 2005-310022 A | 11/2005 |
| JP | 2006-319946 A | 11/2006 |
| JP | 2006313475 A | 11/2006 |

OTHER PUBLICATIONS

European Search Report EP 11190977, dated Mar. 12, 2012.
Office Action from Japanese Application No. 2010-271870, dated Jul. 15, 2014.

* cited by examiner

*Primary Examiner* — Kavita Padmanabhan
*Assistant Examiner* — Douglas Lee
(74) *Attorney, Agent, or Firm* — Lerner, David, Littenberg, Krumholz & Mentlik, LLP (57) ABSTRACT

Systems and methods for operating an appliance control device for selectively controlling a plurality of appliances having a same or common identifier are provided. A control unit may receive a request to register the appliance control device with any of the plurality of appliances having the same identifier. In response to the request, the control unit may select a first appliance based on a registration priority of the first appliance relative to the remaining appliances. Upon selecting the first appliance, the control unit may transmit a request to the selected first appliance for registering the appliance control device with the selected first appliance. In some aspects, the relative registration priorities may be assigned to one or more of the appliances based on a prior registration history and/or distance to the appliance control device.

15 Claims, 8 Drawing Sheets

APPLIANCE CONTROL DEVICE, REGISTRATION METHOD OF APPLIANCE CONTROL DEVICE, AND PROGRAM

CROSS-REFERENCE TO RELATED APPLICATIONS

The present application claims priority from Japanese Patent Application No. JP 2010-271870 filed in the Japan Patent Office on Dec. 6, 2010, the entire content of which is hereby incorporated herein by reference.

BACKGROUND

The present disclosure relates to an appliance control device, a registration method of the appliance control device, and a program.

In related art, an appliance control device causes an appliance that can be controlled via a communication network to register the device. Such an appliance control device first detects controllable appliances and acquires appliance information including an identifier for display from the detected appliances. Next, the appliance control device displays the identifiers for display of the appliances on a specification screen used for specifying an appliance to be the target for registration. Then, when an appliance is specified by a user by the identifier for display, the appliance control device requests the specified appliance to register the device.

SUMMARY

However, when a plurality of appliances having the same identifier for display are detected, the appliance control device of the related art sometimes displays on the specification screen a plurality of the same identifiers for display or a plurality of the same identifiers for display assigned with different sequence numbers. Then, a user has to specify an appliance to be the target for registration from a plurality of the same identifiers for display or a plurality of the same identifiers for display assigned with different sequence numbers, and specifying an appliance becomes confusing.

In light of the foregoing, it is desirable to provide an appliance control device, a registration method of the appliance control device, and a program which are capable of facilitating making a request for registration to an appliance which is the target for registration among a plurality of appliances having the same identifier for display.

In one aspect, an appliance control device for controlling an operation of a plurality of appliances is provided, where each of the plurality of appliances may be associated with a same (or common) identifier. The appliance control device may include a control unit or controller configured to receive a request to register the appliance control device with any of the plurality of appliances. In response to the request, the control unit may select a first appliance from the plurality of appliances, where the first appliance is selected based on a registration priority assigned to the first appliance relative to the registration priorities assigned to the remaining appliances in the plurality of appliances. Upon selecting the first appliance based on its relative registration priority, the control unit may transmit a registration request to the selected first appliance for registration of the appliance control device with the selected first appliance. Thus, the appliance control device may select and register itself with a particular appliance even though each of the plurality of appliances has the same identifier. In addition, the control unit may be further configured to assign respective relative registration priority to one or more of the plurality of appliances that have the same respective identifier, where the assigned respective relative registration priorities may include the relative registration priority that is assigned to the first appliance.

The respective relative registration priority that is assigned to each (or one or more) of the plurality of appliances may be based on a prior registration history regarding one or more of the plurality of appliances. The prior registration history may include information regarding one or more appliances that are newly available for registration (e.g., appliances which have not been registered with the appliance control device before). The prior registration history may also include information regarding one or more appliances that had previously registered the appliance control device, but for which such registration has been cancelled. In such aspects, the control unit may be further configured to prefer the newly available appliances by assigning higher relative registration priorities to the appliances that are newly available for registration and lower relative registration priorities to the appliances for which registration has been previously cancelled.

Alternatively, in another aspect the respective relative registration priority assigned to each of the plurality of appliances may be based on a distance or distances of one or more of the plurality of appliances to the appliance control device. In this case, for example, the control unit may be configured to provide higher (or lower) registration priorities to appliances that are closer (or farther) from the appliance control device. In yet other aspects, the respective relative registration priority assigned to each of the plurality of appliances may be based on a combination of a prior registration history regarding one or more of the plurality of appliances and the distance or distances of one or more of the plurality of appliances to the appliance control device.

In one aspect, the request to register the appliance control device with any of the plurality of appliances may be received based on selection of an aggregate identifier associated with the plurality of appliances. The aggregate identifier associated with the plurality of the appliances may be different than the common identifier with which each of the plurality of appliances identifies itself. In another aspect, the control unit may be further configured to provide an indication of the aggregate identifier to a user. For example, the appliance control device may include display unit. The control unit may provide the indication of the aggregate identifier to the user by displaying the aggregate identifier on the display unit.

The control unit may be further configured to receive a unique identifier from another appliance different from the plurality of appliances having the same respective identifier and display the unique identifier to the user on the display unit separately from the displayed aggregate identifier. The unique identifier received from such other appliance may be a different identifier than the respective common identifier of each of the plurality of appliances. The unique identifier may also be different from the displayed aggregate identifier.

In another aspect, the control unit may also be configured to transmit a detection request to each of the plurality of appliances. The control unit may also receive a detection response from each of the plurality of appliances in response to the detection request, where the detection response received from each of the plurality of appliances may include the respective identifier for the appliance. In another aspect, the control unit may be configured to communicate with one or more of the plurality of appliances over a network, such as, for example, a wireless network.

In various aspects, the appliance control device may be configured as part of a remote control, a portable information terminal, a phone, or a personal computer. In addition, one or more of the plurality of appliances may be configured as part of a television, a projector, a printer, a recorder, a camera, an audio system, a personal computer, a home appliance, or a gaming machine.

A method for operating an appliance control device for controlling an operation of a plurality of appliances is provided. The method may include receiving a request to register the appliance control device with any of the plurality of appliances, where each of the plurality of appliances has a same respective identifier. The method may further include selecting, using a control unit and in response to the request, a first appliance from the plurality of appliances each having the same respective identifier where the first appliance may be selected by the control unit based on a relative registration priority assigned to the first appliance. The method may also include transmitting a registration request to the selected first appliance for registration of the appliance control device with the selected first appliance. In one aspect, the request to register the appliance control device with any of the plurality of appliances may be received by the control unit based on a selection of an aggregate identifier displayed on a display unit.

A non-transitory computer-readable medium on which computer executable instructions of a program are stored is provided. The instructions, when executed by a control unit, may configure the control unit to receive a request to register an appliance control device with any of a plurality of appliances, where each of the plurality of appliances having a same respective identifier. The instructions may further configure the control unit to select, in response to the request, a first appliance from the plurality of appliances each having the same respective identifier, where the first appliance being selected based on a relative registration priority assigned to the first appliance. The instructions may also configure the control unit to transmit a registration request to the selected first appliance for registration of the appliance control device with the selected first appliance.

According to the embodiments of the present disclosure described above, there can be provided an appliance control device, a registration method of the appliance control device, and a program that facilitate making a request for registration to an appliance which is the target for registration among a plurality of appliances having the same identifier for display.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[1. Configuration of Appliance Control System]

Figure 1:
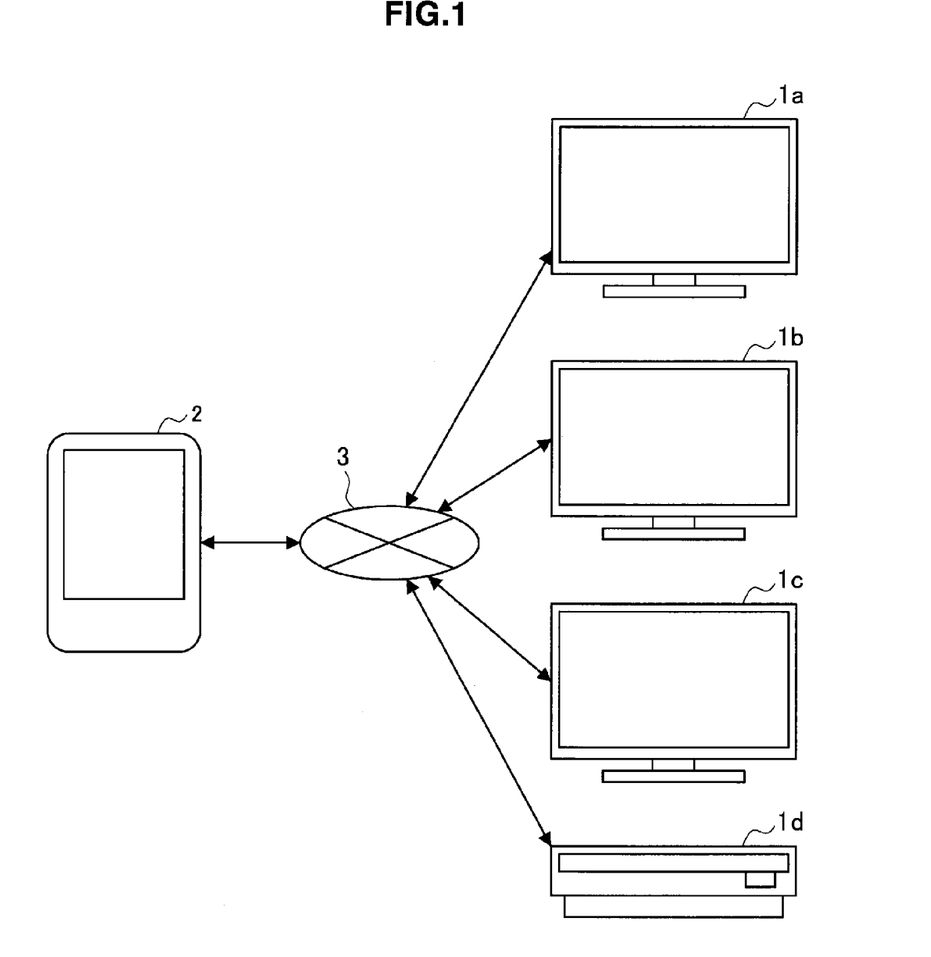
FIG. 1 is a diagram showing an overall configuration of a general appliance control system.

FIG. 1 is a diagram showing an overall configuration of a general appliance control system. As shown in FIG. 1, an appliance control system includes a plurality of appliances 1 (for example, appliances 1a to 1d), and an operation terminal 2 capable of controlling the plurality of appliances 1 via a communication network NW.

The plurality of appliances 1 (a collective term for appliances) are appliances that can be controlled by the operation terminal 2 via the communication network NW, such as displays, projectors, printers, recorders, cameras, audio systems, personal computers, home appliances, and the like, for example. The operation terminal 2 is a terminal capable of controlling the plurality of appliances 1 via the communication network NW, such as a remote control, a portable information terminal, a mobile phone, a display, a personal computer, and the like. The communication network NW is a two-way communication network, such as a wired or wireless network. In the appliance control system, the operation terminal 2 is registered with the appliance 1 that can be controlled via the communication network NW.

In the following, an explanation will be given on a remote operation system, as an example of the appliance control system, which includes a plurality of appliances 1 which are the operation targets, and an operation terminal 2, such as a remote control, capable of operating the plurality of appliances 1 via a network NW. In the remote operation system, the operation terminal 2 is registered with the appliances that can be operated via the network NW. Additionally, the remote operation system is only an example of the appliance control system configured such that the operation terminal 2 is registered with the appliances 1 that can be controlled via the communication network NW.

[2. Procedure for Registration by General Remote Operation System]

Figure 2:
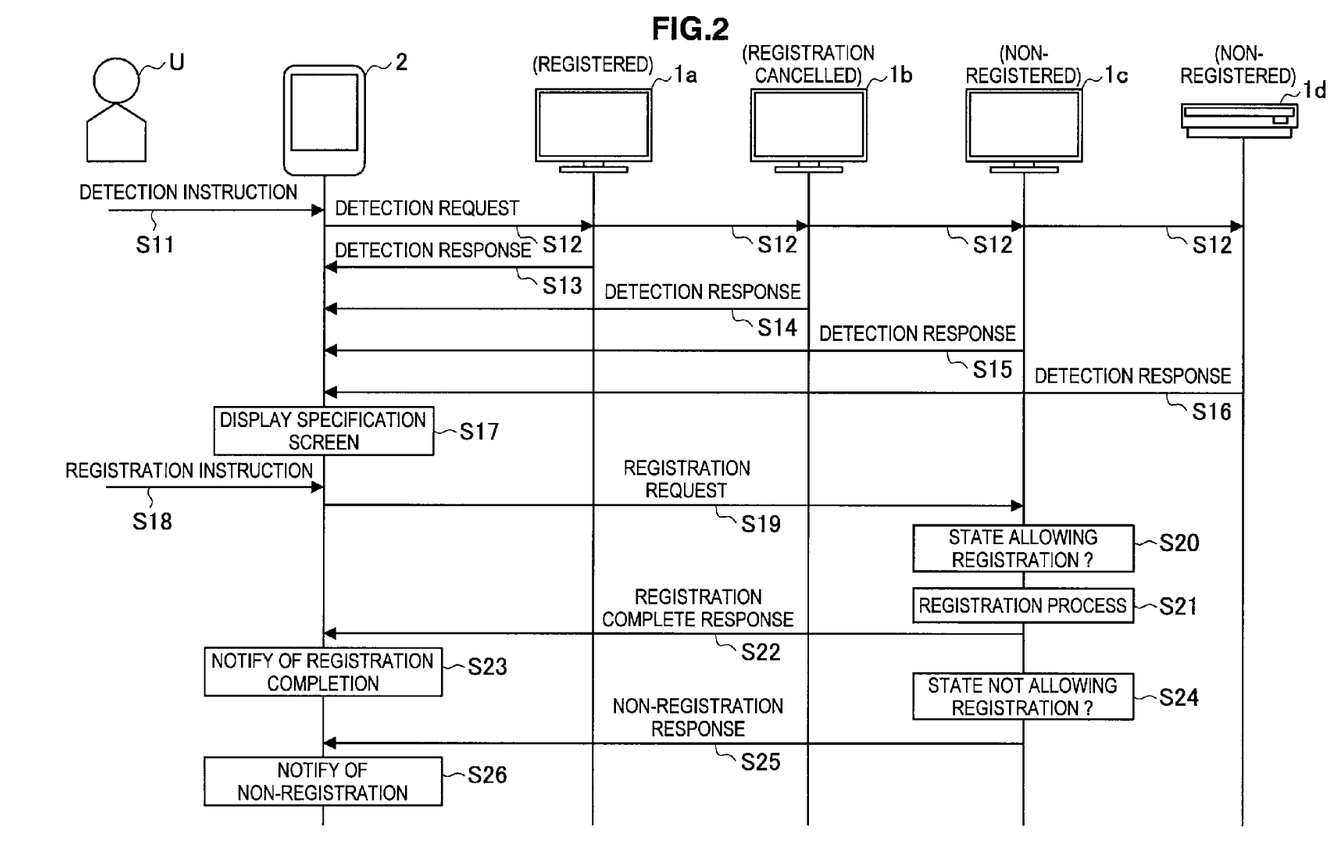
FIG. 2 is a sequence diagram showing a procedure for registration by a general remote operation system.

FIG. 2 is a sequence diagram showing a procedure of registration by a general remote operation system. FIG. 2 shows a remote operation system including an operation terminal 2 and a plurality of appliances 1a to 1d. The appliances 1a to 1c here are assumed to have the same identifiers IDa to IDc for display (an appliance name, a model name, or the like). The appliance 1d is assumed to have an identifier IDd for display different from those of the appliances 1a to 1c. The appliance 1a is assumed to be an appliance 1 with which the operation terminal 2 is already registered. Also, the appliance 1b is assumed to be an appliance 1 from which registration of the operation terminal 2 is cancelled. Furthermore, the appliances 1c and 1d are assumed to be appliances 1 that will newly perform registration.

As shown in FIG. 2, in the case of performing registration of the operation terminal 2, the operation terminal 2 detects the appliances 1a to 1d that can be controlled via the network NW. The operation terminal 2 distributes a detection request including its connection information on the network NW (step S12). Additionally, detection of the appliance 1 may be performed according to a detection instruction from a user U (step S11), or it may be automatically performed by the operation terminal 2 when a predetermined condition is met.

When the detection request is received, the appliances 1a to 1d transmit detection responses including their appliance information to the operation terminal 2 (steps S13 to S16). The appliance information includes, in addition to the network address of an appliance 1, the communication protocol, and the like, an identifier ID for display (an appliance name, a model name, or the like). When the detection responses are received, the operation terminal 2 displays, on a specification screen S for specifying an appliance 1 that is to be the target for registration, identifiers IDb to IDd for display of the appliances 1b to 1d among the appliances 1a to 1d, excluding the appliance 1a with which registration is already done (step S17). Additionally, an operation of cancelling the registration of the operation terminal 2 can also be performed on the specification screen S, but the detailed explanation will be omitted.

Then, when the specification screen S is displayed, the user U instructs registration of the operation terminal 2 by specifying the appliance 1 that is to be the target for registration using the identifiers IDb to IDd for display of the appliances 1b to 1d (step S18). In the following, an explanation will be given assuming that the appliance 1c has been specified. When the instruction for registration is received, the operation terminal 2 transmits a registration request including its setting information to the specified appliance 1c (step S19).

When the registration request is received, the appliance 1c determines whether it is in a state allowing registration (a registration waiting state or the like). Then, in the case it is in a state allowing registration (step S20), the appliance 1c registers the operation terminal 2 based on the setting information (step S21), and transmits a registration complete response to the operation terminal 2 (step S22). On the other hand, in the case it is in a state not allowing registration (step S24), the appliance 1c notifies a non-registration response, together with its status information, to the operation terminal 2 without registering the operation terminal 2 (step S25). When the registration complete response is received, the operation terminal 2 notifies the user U of completion of registration (step S23), or when the non-registration response is received, the operation terminal 2 notifies the user U of the state of the appliance 1c based on the status information (step S26).

Figure 3:
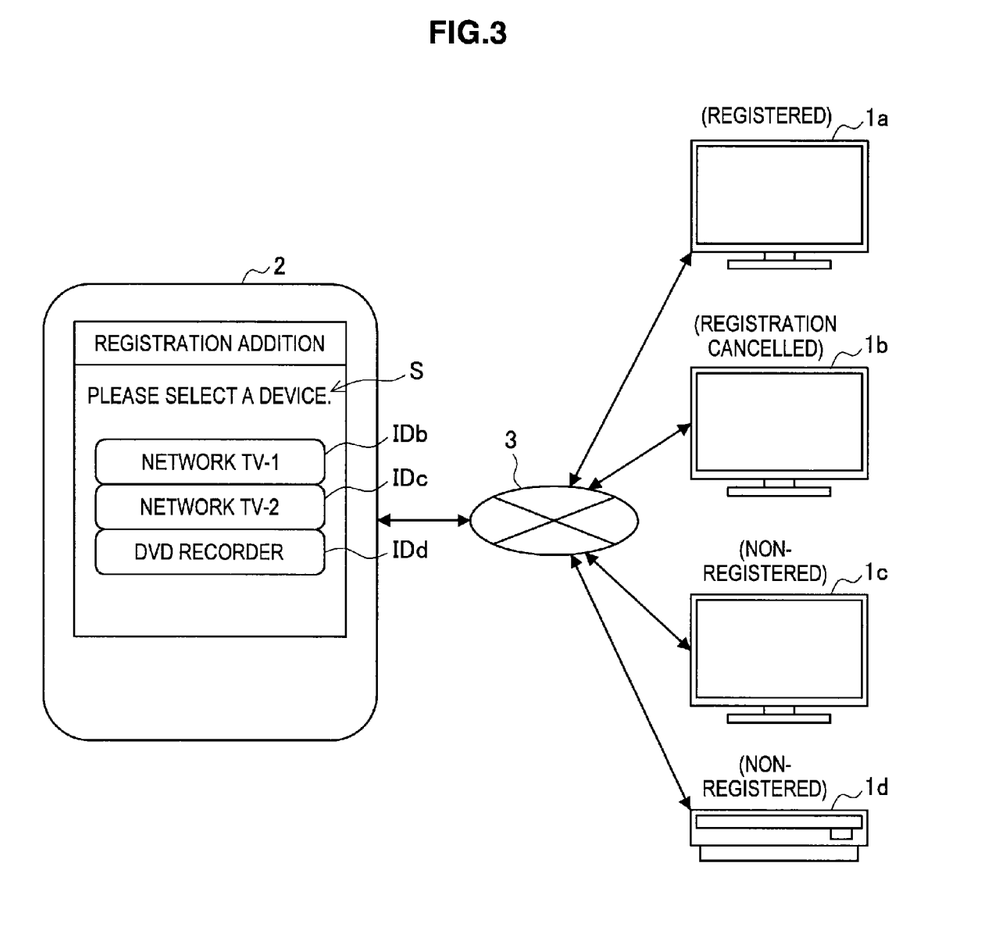
FIG. 3 is a diagram (1/2) for describing registration by the remote operation system shown in FIG. 2.

At this time, as shown in FIG. 3, for example, the identifiers IDb to IDd for display of the appliances 1b to 1d are displayed on the specification screen S. In the example shown in FIG. 3, the identifiers IDb and IDc for display of the appliances 1b and 1c are assigned with different sequence numbers, and displayed in alignment together with the identifier IDd for display of the appliance 1d. Additionally, the sequence number is a number that is automatically assigned by the operation terminal 2 based on the order of reception of the detection responses or the like, for example, and is not for facilitating identification of the appliance 1 by the user U. Also, the identifiers IDb and IDc for display of the appliances 1b and 1c may also be displayed in alignment together with the identifier IDd for display of the appliance 1d without being assigned with the sequence numbers. However, with such specification screen S, the user U is not allowed to appropriately distinguish between the appliances 1 having the same identifier ID for display (a collective term for identifiers for display), and specifying an appliance 1 becomes confusing.

Figure 4:
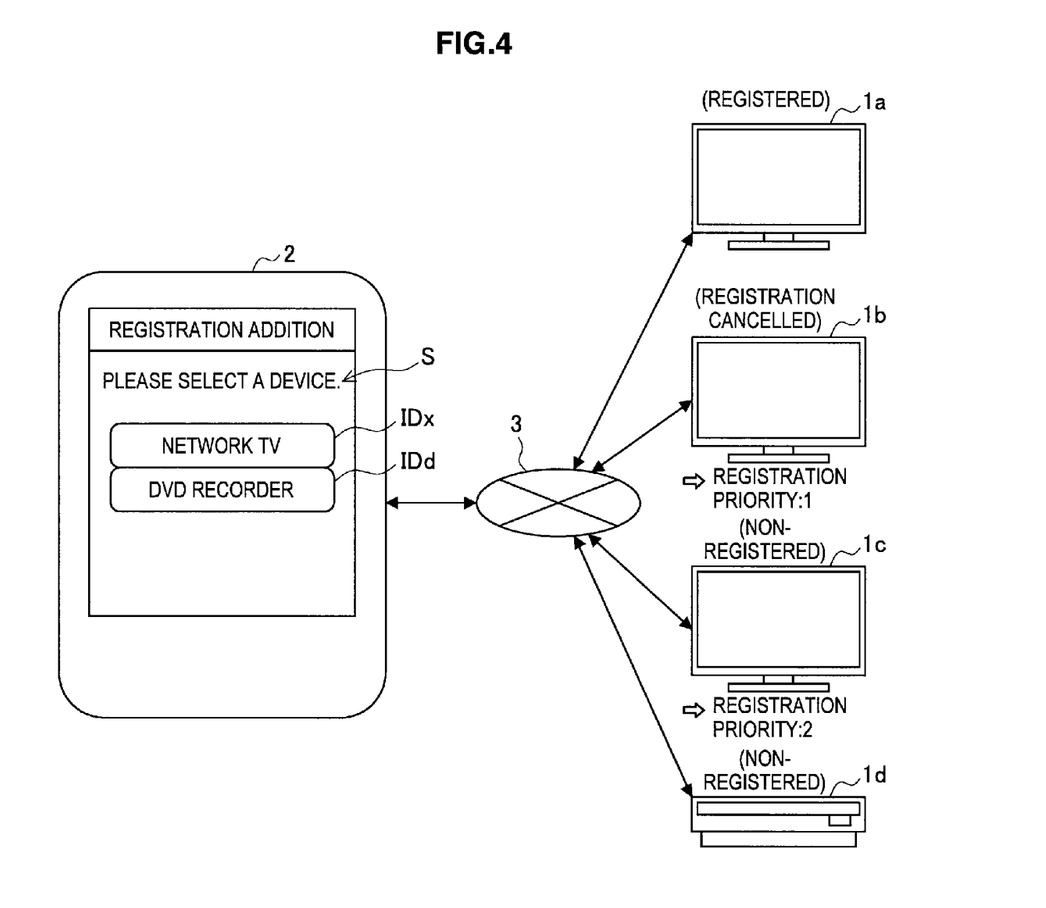
FIG. 4 is a diagram (2/2) for describing registration by the remote operation system shown in FIG. 2.

Furthermore, as shown in FIG. 4, for example, identifiers IDx and IDd for display of the appliances 1b to 1d may be displayed on the specification screen S. In the example shown in FIG. 4, the identifiers IDb and IDc for display of the appliances 1b and 1c are aggregated as one identifier IDx for display (names are identified), and is displayed in alignment with the identifier IDd for display of the appliance 1d. The aggregated identifier IDx for display (also referred to as the aggregate identifier IDx for display) is displayed in the similar manner as the identifier IDd for display of the appliance 1d, and the user U will recognize the same as the identifier ID for display of a single appliance as with the other identifier IDd for display. Additionally, the operation terminal 2 holds the identifiers IDb and IDc for display of the appliances 1b and 1c in association with the order of reception of detection responses or the like, for example.

Then, when the user U specifies the aggregate identifier IDx for display, the following process is performed assuming that an instruction is issued for registration with the appliance 1 whose detection response was detected earliest, for example. However, when the detection response from the appliance 1b is received earlier than from the appliance 1c, registration is requested to the appliance 1b even if registration with the appliance 1c which is the new target for registration is desired by the user U. With such process, the user U is not allowed to appropriately specify an appliance 1 among the appliances 1 having the same identifier ID for display, and specifying an appliance 1 becomes confusing.

[3. Functional Configuration of Operation Terminal 2]

Figure 5:
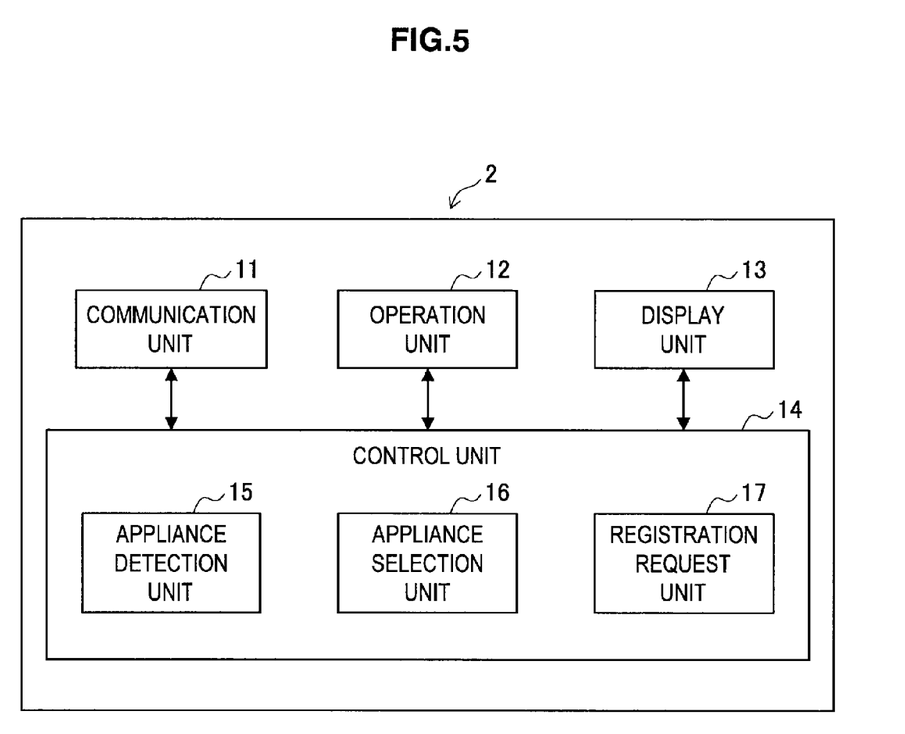
FIG. 5 is a block diagram showing a functional configuration of an operation terminal according to an embodiment of the present disclosure.

FIG. 5 is a block diagram showing a functional configuration of an operation terminal 2 according to an embodiment of the present disclosure. As shown in FIG. 5, the operation terminal 2 includes a communication unit 11, an operation unit 12, a display unit 13, and a control unit 14. The control unit 14 functions also as an appliance detection unit 15, an appliance selection unit 16, and a registration request unit 17.

The communication unit 11 communicates with the appliance 1 via the network NW. The communication unit 11 distributes a detection request on the network NW for appliance detection, and receives detection responses from appliances 1 capable of connecting. The communication unit 11 transmits, for registration, a registration request to a specific appliance 1, and receives a registration complete response or a non-registration response depending on whether the specific appliance 1 is in a state allowing registration. The communication unit 11 is configured as a communication device for performing two-way communication with a plurality of appliances 1 via the network NW.

The operation unit 12 receives, from the user U, an instruction for appliance detection, specification of an appliance 1 that is to be the target for registration, and the like. The operation unit 12 is configured as an input device such as keys, buttons, a touch sensor, or the like.

The display unit 13 displays the specification screen S used for specifying an appliance 1 that is to be the target for registration, the result of registration, the state of an appliance 1, and the like. Particularly, the display unit 13 aggregates the identifiers ID for display of a plurality of appliances 1 having the same identifier ID for display as one identifier ID for display (name identification), and displays the same on the specification screen S as the aggregate identifier IDx for display. The display unit 13 may be structured from a liquid crystal display (LCD), an organic electroluminescent display, a plasma display, or the like, or it may be configured as touch panel allowing an operation input by the user U.

The control unit 14 performs arithmetic processing or control processing to realize operation of the operation terminal 2. The control unit 14 also functions, in cooperation with the communication unit 11, as the appliance detection unit 15 for detecting a plurality of appliances 1 having the same identifier ID for display. The control unit also functions as the appliance selection unit 16 for selecting an appliance 1 with the highest registration priority, among the plurality of appliances 1 that have been detected. The control unit 14 also functions as the registration request unit 17 for requesting the selected appliance 1 to register the operation terminal 2. The control unit 14 is configured from a CPU, a ROM, a RAM, and the like, and the operation of the operation terminal 2 described later is realized by the CPU developing and executing a program stored in a non-transitory computer-readable medium such as the ROM, a hard disc, etc.

[4. Operation of Operation Terminal 2]

Figure 6:
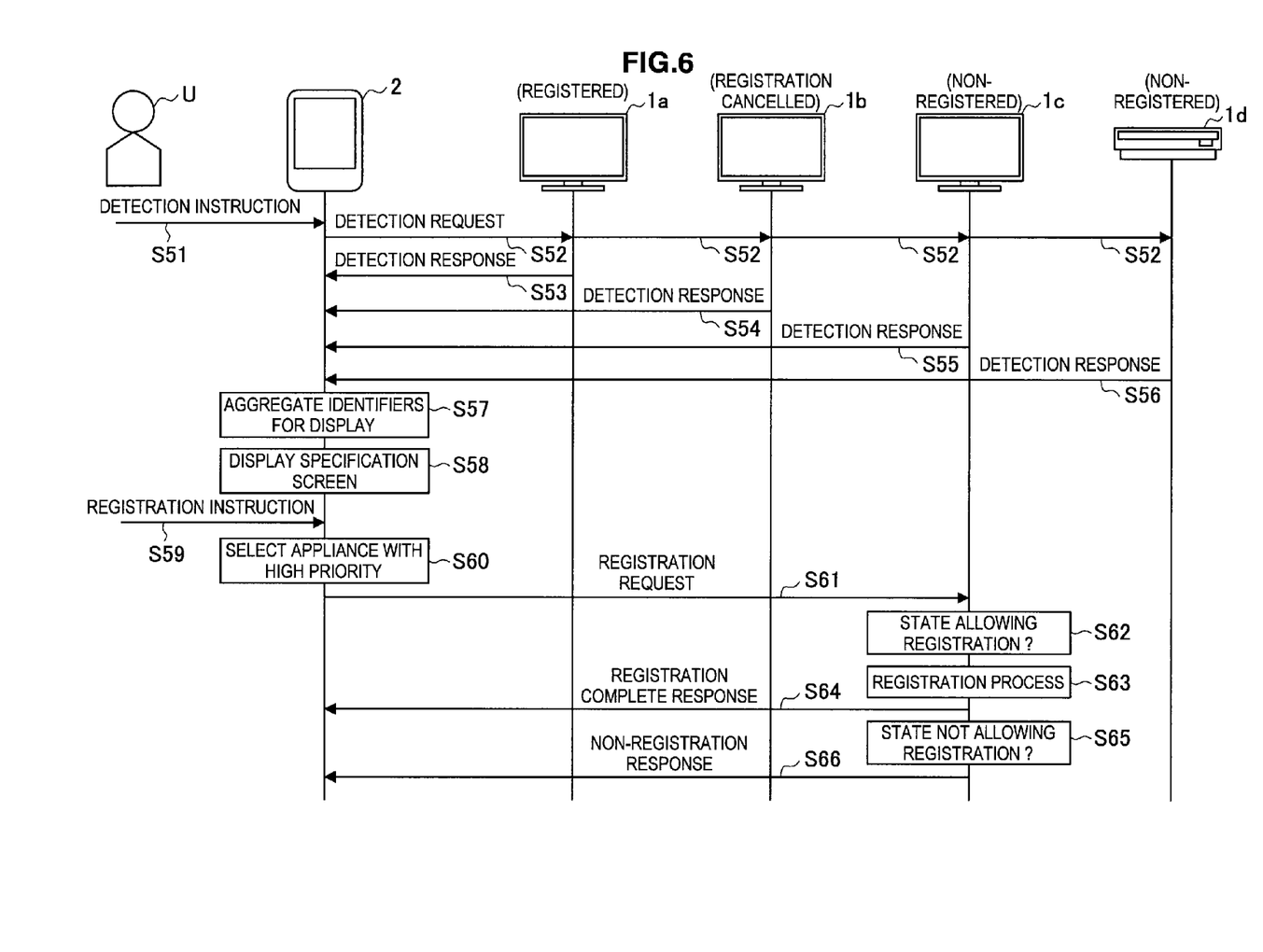
FIG. 6 is a sequence diagram showing a procedure for registration using the operation terminal.

FIG. 6 is a sequence diagram showing a procedure for registration using the operation terminal 2. Similarly to FIG. 2, FIG. 6 shows a remote operation system including the operation terminal 2 and a plurality of appliances 1a to 1d. The appliances 1a to 1c here are assumed to have the same identifiers IDa to IDc for display (an appliance name, a model name, or the like), and the appliance 1d is assumed to have an identifier IDd for display different from those of the appliances 1a to 1c. It is also assumed that the appliance 1a is an appliance 1 with which the operation terminal 2 is already registered, the appliance 1b is an appliance 1 from which registration of the operation terminal 2 is cancelled, and the appliances 1c and 1d are appliances 1 which are newly made the targets for registration.

As shown in FIG. 6, for registration of the operation terminal 2, the appliance detection unit 15 detects the appliances 1a to 1d that are controllable, in cooperation with the communication unit 11. When a detection request is received (step S52), the appliances 1a to 1d transmit detection responses to the operation terminal 2 (steps S53 to S56). When the detection responses are received from the appliances 1a to 1d, the registration request unit 17 determines, based on appliance information, that the appliance 1a, among the appliances 1a to 1d, is an appliance 1 with which the operation terminal 2 is already registered. The control unit 14 displays on the specification screen S, in cooperation with the display unit 13, identifiers IDb to IDd for display of the appliances 1b to 1d, excluding the appliance 1a with which registration is already done. Additionally, the identifiers IDb to IDd for display are included in the detection responses as a part of the appliance information.

Figure 7:
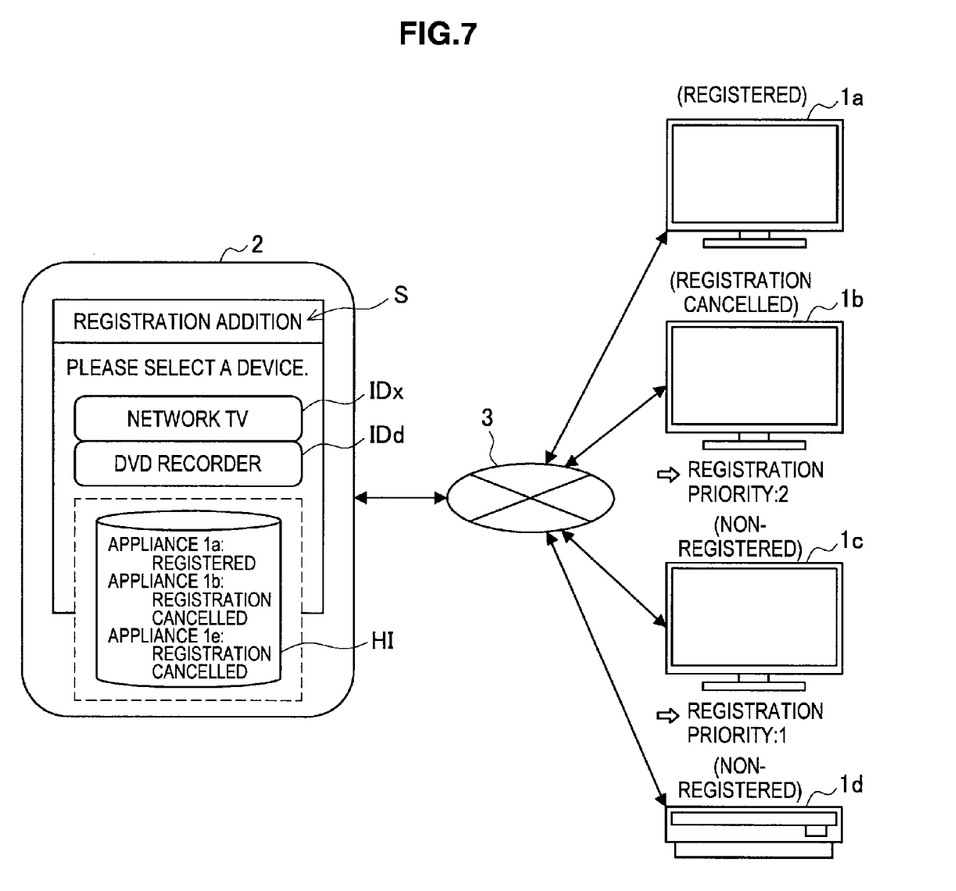
FIG. 7 is a diagram for describing registration based on a history of registration in an appliance.

At this time, when it is determined, based on the appliance information, that the identifiers IDb and IDc for display of the appliances 1b and 1c are the same, the control unit 14 aggregates (identifies) the identifiers IDb and IDc for display of the appliances 1b and 1c as one identifier ID for display (step S57). As shown in FIG. 7, the control unit 14 displays on the specification screen S, in cooperation with the display unit 13, an aggregate identifier IDx for display of the appliances 1b and 1c and the identifier IDd for display of the appliance 1d (step S58).

The appliances 1 having the same identifiers IDb and IDc for display are displayed here by the aggregate identifier IDx for display, and the user U does not have to select an appliance 1 that is to be the target for registration from a plurality of the same identifiers IDb and IDc for display or a plurality of the same identifiers IDb and IDc for display assigned with different sequence numbers, thereby preventing confusion in the specification of an appliance 1. Additionally, even if the identifiers IDb and IDc for display are aggregated as one, the control unit 14 is in a state where the appliances 1b and 1c can be distinguished based on the appliance information.

First, a case where registration with the appliance 1d is instructed will be described. In this case, the control unit 14 receives, via the operation unit 12, the instruction for registration specifying the identifier IDd for display of the appliance 1d. Then, the control unit 14 determines that the identifier IDd for display of the appliance 1d is not the aggregate identifier IDx for display, and the registration request unit 17 transmits a registration request including the setting information of the operation terminal 2 to the appliance 1d.

When the registration request is received, the appliance 1d determines whether it is in a state allowing registration (a registration waiting state or the like). Then, in the case it is in a state allowing registration, the appliance 1d registers the operation terminal 2 based on the setting information, and transmits a registration complete response to the operation terminal 2. When the registration complete response is received, the control unit 14 notifies the user U of the completion of registration, in cooperation with the display unit 13. Furthermore, the control unit 14 updates the display of the specification screen S, in cooperation with the display unit 13, to display only the aggregate identifier IDx for display of the appliances 1b and 1c on the specification screen S.

Next, a case where an instruction for registration with the appliances 1b and 1c corresponding to the aggregate identifier IDx for display is issued will be described. In this case, the control unit 14 receives, via the operation unit 12, the instruction for registration specifying the aggregate identifier IDx for display (step S59). Then, the appliance selection unit 16 selects an appliance 1 with the highest registration priority between the appliance 1b and 1c (step S60). An explanation will be given here assuming a case where the appliance 1c is selected. Additionally, as will be described later, the registration priority of an appliance 1 is determined based on a history HI of registration in the appliance 1, information DI on a distance to the appliance 1, or the like. When the appliance 1c is selected, the registration request unit 17 transmits, in cooperation with the communication unit 11, a registration request to the appliance 1c together with the setting information of the operation terminal 2 (step S61).

When the registration request is received, the appliance 1c determines whether it is in a state allowing registration (a registration waiting state or the like) (step S62). Then, in the case it is in a state allowing registration, the appliance 1c registers the operation terminal 2 based on the setting information (step S63), and transmits a registration complete response to the operation terminal 2 (step S64). On the other hand, in the case it is in a state not allowing registration (step S65), the appliance 1c notifies a non-registration response including its status information to the operation terminal 2 (step S66). When the non-registration response is received, the registration request unit 17 selects the other appliance 1b, of the appliances 1b and 1c corresponding to the aggregate identifier IDx for display, which is in a state allowing registration, and performs the processing as in the case for the appliance 1c.

FIG. 7 is a diagram for describing registration based on the history HI of registration in an appliance 1. As shown in FIG. 7, the history HI of registration of the operation terminal 2 in an appliance 1 is managed at the operation terminal 2. Whether registration has been cancelled or not is managed, together with the registration with the appliance 1, as the history HI of registration. In the example shown in FIG. 7, it can be seen that the operation terminal 2 is registered with the appliance 1a, and registrations in the appliance 1b and an appliance 1e are cancelled.

The appliance selection unit 16 refers to the history HI of registration, and selects an appliance 1 which is newly made the target for registration as the appliance 1 with the highest registration priority. Since registration of the operation terminal 2 is generally performed with an appliance 1 which is newly made the target for registration, it can be said that the appliance 1 which is newly made the target for registration is more likely to be selected than other appliances 1. Thus, by preferentially selecting the appliance 1 which is newly made the target for registration, registration can be requested to an appliance 1 desired by the user U with a high probability. In the example shown in FIG. 7, the history HI of registration in the appliance 1c, among the appliances 1b and 1c corresponding to the aggregate identifier IDx for display, is not managed. Accordingly, the appliance selection unit 16 determines the appliance 1c to be the appliance 1 which is newly made the target for registration, and selects the same.

Additionally, in the case there is no appliance 1 which is to be newly made the target for registration, an appliance 1 from which registration has been cancelled (for example, the appliance 1b) may also be selected. Further, if the selected appliance 1 is in a state not allowing registration, another appliance 1 that is in a state allowing registration (for example, the appliance 1b) may also be selected. Furthermore, in the case there are a plurality of appliances 1 which are to be newly made the targets for registration, the plurality of appliances 1 may also be selected.

Figure 8:
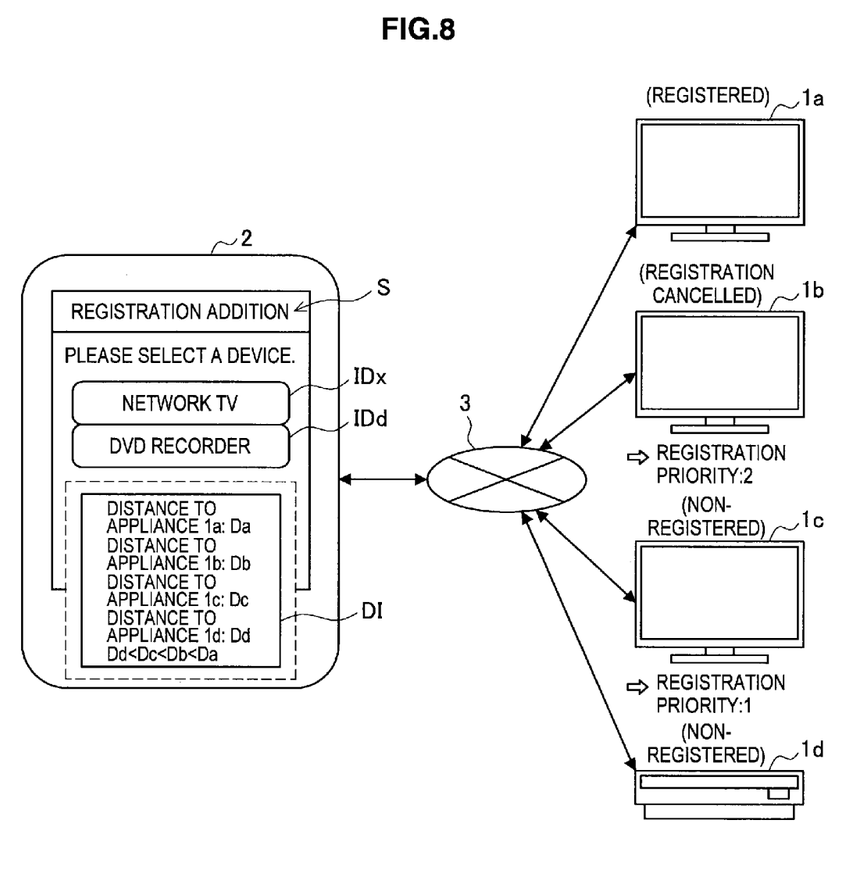
FIG. 8 is a diagram for describing registration based on the distance to an appliance.

FIG. 8 is a diagram for describing registration based on information DI on the distance to an appliance 1. As shown in FIG. 8, the distance to a controllable appliance 1 is acquired at the operation terminal 2. Information DI on the distance to an appliance 1 may be acquired from the appliance 1 as positional information from GPS or the like, or it may be acquired as a result of distance measurement performed with the appliance 1 or as the intensity of a signal received from the appliance 1. In the example shown in FIG. 8, a distance Da to the appliance 1a, a distance Db to the appliance 1b, a distance Dc to the appliance 1c, and a distance Dd to the appliance 1d have a relationship of Dd<Dc<Db<Da.

The appliance selection unit 16 refers to the pieces of information DI on the distance to appliances 1, and selects the nearest appliance 1 as the appliance 1 with the highest registration priority. Since registering of the operation terminal 2 is generally performed near an appliance 1 which is the target for registration, it can be said that the appliance 1 which is the nearest to the operation terminal is more likely to be selected than other appliances 1. Thus, by preferentially selecting the nearest appliance 1, registration can be requested to an appliance 1 desired by the user U with a high probability. In the example shown in FIG. 8, the appliance 1c is the nearest, among the appliances 1b and 1c corresponding to the aggregate identifier IDx for display. Accordingly, the appliance selection unit 16 determines the appliance 1c to be the nearest appliance 1, and selects the same.

Furthermore, the appliance selection unit 16 may refer to both the history HI of registration in an appliance 1 and the information DI on the distance to an appliance 1 to determine the degree of the registration priority. For example, in the case there are a plurality of appliances 1 to be newly made the targets for registration, registration can be requested to the appliance 1 desired by the user U with an even higher probability by preferentially selecting the nearest appliance 1.

As described above, according to the method of the present embodiment of registration by the appliance 1, a plurality of appliances 1 having the same identifier ID for display are displayed after being aggregated as one aggregate identifier IDx for display. Then, when an appliance 1 which is to be the target for registration is specified by the aggregate identifier IDx for display, an appliance 1 that is newly made the target for registration and/or the nearest appliance 1 is selected as the appliance 1 with the highest registration priority and registration thereof is requested.

This prevents confusion in the specification of an appliance 1 by having the user U specify the appliance 1 by the aggregate identifier IDx for display even where there are a plurality of appliances 1 with the same identifier ID for display. Furthermore, if an appliance 1 is specified by the aggregate identifier IDx for display, the appliance 1 that is newly made the target for registration and/or the nearest appliance 1 is preferentially selected and registration thereof is requested, and thus registration of the appliance 1 desired by the user U can be requested with high probability. Accordingly, the user U can easily request registration to the appliance 1 which is the target for registration, among a plurality of appliances 1 having the same identifier ID for display.

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An appliance control device for controlling an operation of a plurality of appliances, the appliance control device comprising:
a control unit configured to operate so as to:
receive a request to register the appliance control device with any of the plurality of appliances, each of the plurality of appliances having a same respective identifier;
select, in response to the request, a first appliance from the plurality of appliances each having the same respective identifier, the first appliance being selected based on a relative registration priority assigned to the first appliance; and,
transmit a registration request to the selected first appliance for registration of the appliance control device with the selected first appliance,
in which the control unit is further configured to assign a respective relative registration priority to each of the plurality of appliances determined to have the same respective identifier, the assigned respective relative registration priorities including the relative registration priority assigned to the first appliance,
in which the respective relative registration priority assigned to each of the plurality of appliances is based on a prior registration history regarding one or more of the plurality of appliances, and
in which the prior registration history identifies one or more appliances that are newly available for registration and one or more appliances for which registration has been previously cancelled, and the control unit is further configure to assign higher relative registration priorities to the appliances that are newly available for registration and lower relative registration priorities to the appliances for which registration has been previously cancelled.

2. An appliance control device for controlling an operation of a plurality of appliances, the appliance control device comprising:
a control unit configured to operate so as to:
receive a request to register the appliance control device with any of the plurality of appliances, each of the plurality of appliances having a same respective identifier;
select, in response to the request, a first appliance from the plurality of appliances each having the same respective identifier, the first appliance being selected based on a relative registration priority assigned to the first appliance; and, transmit a registration request to the selected first appliance for registration of the appliance control device with the selected first appliance, wherein the control unit is further configured to assign a respective relative registration priority to each of the plurality of appliances determined to have the same respective identifier, the assigned respective relative registration priorities including the relative registration priority assigned to the first appliance, and wherein the respective relative registration priority assigned to each of the plurality of appliances is based on a distance or distances of one or more of the plurality of appliances to the appliance control device.

3. An appliance control device for controlling an operation of a plurality of appliances, the appliance control device comprising:

a control unit configured to operate so as to:

receive a request to register the appliance control device with any of the plurality of appliances, each of the plurality of appliances having a same respective identifier;

select, in response to the request, a first appliance from the plurality of appliances each having the same respective identifier, the first appliance being selected based on a relative registration priority assigned to the first appliance; and, transmit a registration request to the selected first appliance for registration of the appliance control device with the selected first appliance, wherein the control unit is further configured to assign a respective relative registration priority to each of the plurality of appliances determined to have the same respective identifier, the assigned respective relative registration priorities including the relative registration priority assigned to the first appliance, and wherein the respective relative registration priority assigned to each of the plurality of appliances is based on a combination of a prior registration history regarding one or more of the plurality of appliances and a distance or distances of one or more of the plurality of appliances to the appliance control device.

4. The appliance control device of claim 2, wherein the request to register the appliance control device with any of the plurality of appliances is received based on selection of an aggregate identifier associated with the plurality of appliances.

5. The appliance control device of claim 4, wherein the control unit is further configured to provide an indication of the aggregate identifier to a user.

6. The appliance control device of claim 5, wherein the appliance control device comprises a display unit, and wherein the control unit is further configured to provide the indication of the aggregate identifier to the user by displaying the aggregate identifier on the display unit.

7. The appliance control device of claim 6, wherein the control unit is further configured to:

receive a unique identifier from another appliance different from the plurality of appliances having the same respective identifier, the unique identifier received from the another appliance being a different identifier than the respective identifier of each of the plurality of appliances and different from the displayed aggregate identifier; and, display the unique identifier to the user on the display unit separately from the displayed aggregate identifier.

8. The appliance control device of claim 2, wherein the control unit is further configured to:

transmit a detection request to each of the plurality of appliances;

receive a detection response from each of the plurality of appliances in response to the detection request, wherein the detection response received from each of the plurality of appliances includes the respective identifier for the appliance.

9. The appliance control device of claim 2, wherein the control unit is further configured to communicate with one or more of the plurality of appliances over a network.

10. The appliance control device of claim 9, wherein the network is a wireless network.

11. The appliance control device of claim 2, wherein the appliance control device is configured as a remote control, a portable information terminal, a phone, or a personal computer.

12. The appliance control device of claim 2, wherein at least one of the plurality of appliances is configured as a television, a projector, a printer, a recorder, a camera, an audio system, a personal computer, a home appliance, or a gaming machine.

13. A method for operating an appliance control device for controlling an operation of a plurality of appliances, the method comprising:

receiving a request to register the appliance control device with any of the plurality of appliances, each of the plurality of appliances having a same respective identifier;

selecting, using a control unit and in response to the request, a first appliance from the plurality of appliances each having the same respective identifier, the first appliance being selected by the control unit based on a relative registration priority assigned to the first appliance; and, transmitting a registration request to the selected first appliance for registration of the appliance control device with the selected first appliance, wherein the method further comprises assigning a respective relative registration priority to each of the plurality of appliances determined to have the same respective identifier, the assigned respective relative registration priorities including the relative registration priority assigned to the first appliance, and wherein the respective relative registration priority assigned to each of the plurality of appliances is based on a distance or distances of one or more of the plurality of appliances to the appliance control device.

14. The method of claim 13, wherein the request to register the appliance control device with any of the plurality of appliances is received based on a selection of an aggregate identifier displayed on a display unit.

15. A non-transitory computer-readable medium on which computer executable instructions of a program are stored, the instructions, when executed by a control unit, causing the control unit to:

receive a request to register an appliance control device with any of a plurality of appliances, each of the plurality of appliances having a same respective identifier;

select, in response to the request, a first appliance from the plurality of appliances each having the same respective identifier, the first appliance being selected based on a relative registration priority assigned to the first appliance; and, transmit a registration request to the selected first appliance for registration of the appliance control device with the selected first appliance, wherein the method further comprises assigning a respective relative registration priority to each of the plurality of appliances determined to have the same respective identifier, the assigned respective relative registration priorities including the relative registration priority assigned to the first appliance, and wherein the respective relative registration priority assigned to each of the plurality of appliances is based on a distance or distances of one or more of the plurality of appliances to the appliance control device.

* * * * *